United States Patent
Haus

(10) Patent No.: US 11,490,997 B2
(45) Date of Patent: Nov. 8, 2022

(54) ADAPTER FOR ATTACHING A DENTAL SUPERSTRUCTURE TO A DENTAL IMPLANT AND DENTAL ASSEMBLY COMPRISING THE ADAPTER

(71) Applicant: NOBEL BIOCARE SERVICES AG, Kloten (CH)

(72) Inventor: Adrian Haus, Mahwah, NJ (US)

(73) Assignee: Nobel Biocare Services AG, Kloten (CH)

( * ) Notice: Subject to any disclaimer, the term of this patent is extended or adjusted under 35 U.S.C. 154(b) by 401 days.

(21) Appl. No.: 15/745,418

(22) PCT Filed: Jul. 14, 2016

(86) PCT No.: PCT/EP2016/066819
§ 371 (c)(1),
(2) Date: Jan. 16, 2018

(87) PCT Pub. No.: WO2017/016893
PCT Pub. Date: Feb. 2, 2017

(65) Prior Publication Data
US 2018/0206945 A1 Jul. 26, 2018

(30) Foreign Application Priority Data
Jul. 24, 2015 (EP) .................................. 15178182

(51) Int. Cl.
*A61C 8/00* (2006.01)
(52) U.S. Cl.
CPC ............ *A61C 8/0057* (2013.01); *A61C 8/006* (2013.01); *A61C 8/0059* (2013.01);
(Continued)
(58) Field of Classification Search
CPC .............................................. A61C 8/00–0089
(Continued)

(56) References Cited

U.S. PATENT DOCUMENTS

| 5,281,140 A * | 1/1994 | Niznick | ................ A61C 8/005 433/172 |
| 6,394,806 B1 | 5/2002 | Kumar | |

(Continued)

FOREIGN PATENT DOCUMENTS

| EP | 2 127 612 A1 | 12/2009 |
| GB | 2509135 A | 6/2014 |

(Continued)

OTHER PUBLICATIONS

International Search Report for Application No. PCT/EP2016/066819 dated Oct. 4, 2016 in 2 pages [the ISR for the PCT Application of this US national phase application].

*Primary Examiner* — Yogesh P Patel
(74) *Attorney, Agent, or Firm* — Knobbe, Martens, Olson & Bear, LLP

(57) ABSTRACT

The invention relates to an adapter (1, 1') for attaching a dental superstructure (50) to a dental implant (30). The adapter (1, 1') comprises a coronal attachment portion (2, 2') for attaching the adapter (1, 1') to the dental superstructure (50), an apical attachment portion (4) for attaching the adapter (1, 1') to the dental implant (30) and an intermediate portion (6) arranged between the coronal attachment portion (2, 2') and the apical attachment portion (4). The apical attachment portion (4) is a protrusion defining an apical end portion of the adapter (1, 1') and configured to be received in a corresponding recess (32) of the dental implant (30). The protrusion is rotationally symmetric, so that the adapter (1, 1') is rotatable relative to the dental implant (30) in the state of attachment of the adapter (1, 1') to the dental implant (30). Further, the invention relates to a dental assembly comprising the dental superstructure (50) and at least one such adapter (1, 1').

10 Claims, 9 Drawing Sheets

(52) U.S. Cl.
CPC .......... *A61C 8/0062* (2013.01); *A61C 8/0063* (2013.01); *A61C 8/0065* (2013.01); *A61C 8/0068* (2013.01); *A61C 8/0089* (2013.01)

(58) Field of Classification Search
USPC .................................................. 433/172–176
See application file for complete search history.

(56) References Cited

U.S. PATENT DOCUMENTS

| | | | |
|---|---|---|---|
| 6,644,969 B2 | 11/2003 | Kumar | |
| 8,033,826 B2* | 10/2011 | Towse | A61C 8/006 |
| | | | 433/172 |
| 9,662,186 B2 | 5/2017 | Haus | |
| 9,668,833 B2 | 6/2017 | Fischer et al. | |
| 10,149,741 B2 | 12/2018 | Haus et al. | |
| 2006/0216672 A1* | 9/2006 | Dinkelacker | A61C 8/0069 |
| | | | 433/173 |
| 2008/0153066 A1* | 6/2008 | Schlussel | A61C 8/0069 |
| | | | 433/213 |
| 2008/0166680 A1* | 7/2008 | Kast | A61C 8/0066 |
| | | | 433/37 |
| 2011/0076644 A1* | 3/2011 | Engman | A61C 8/005 |
| | | | 433/174 |
| 2012/0077149 A1 | 3/2012 | Ospelt et al. | |
| 2014/0205969 A1* | 7/2014 | Marlin | A61B 6/145 |
| | | | 433/173 |
| 2015/0030993 A1 | 1/2015 | von Malottki et al. | |
| 2015/0037759 A1 | 2/2015 | Zipprich et al. | |
| 2015/0305836 A1* | 10/2015 | Fischer | A61C 8/0069 |
| | | | 433/173 |

FOREIGN PATENT DOCUMENTS

| | | |
|---|---|---|
| JP | H06-505645 | 6/1994 |
| WO | WO 92/10145 | 6/1992 |
| WO | WO 2009/060415 A2 | 5/2009 |
| WO | WO 2014/095033 A1 | 6/2014 |
| WO | WO 2014/095034 A1 | 6/2014 |
| WO | WO 2015/066438 A1 | 5/2015 |

* cited by examiner (a)

(b)

(c)

ADAPTER FOR ATTACHING A DENTAL SUPERSTRUCTURE TO A DENTAL IMPLANT AND DENTAL ASSEMBLY COMPRISING THE ADAPTER

CROSS-REFERENCE TO RELATED APPLICATIONS

This application is a national stage application under 35 U.S.C. § 371 of International Application No. PCT/EP2016/066819, filed on Jul. 14, 2016, which published in English as WO 2017/016893 A1 on Feb. 2, 2017, and which claims priority benefit of EP Patent Application No. 15178182.0, filed on Jul. 24, 2015.

FIELD OF THE INVENTION

The present invention relates to an adapter for attaching a dental superstructure to a dental implant. Further, the invention relates to a dental assembly comprising a dental superstructure and at least one such adapter and to a dental assembly comprising a dental implant and such an adapter.

BACKGROUND ART

Dental superstructures, such as dental bridges, are widely used for the treatment of partly or fully edentulous patients. These superstructures are attached to dental implants placed in a patient's jaw bone with or without the use of adapters. Commonly, for the former of these two approaches, the adapters are screwed on the implants arranged in the jaw bone and the dental superstructure is cemented to the adapters. The attachment of the dental superstructure to the adapters by cementing helps to compensate misfits or misalignments between superstructure and implant, thus supporting in-lab milling of the superstructure. In this way, the cemented attachment provides a failure/tolerance compensating feature.

However, the use of cement for attaching the dental superstructure to the adapter or adapters bears the risk of causing inflammation in the patient's mouth and is thus disadvantageous from a clinical perspective. Further, once the superstructure has been attached to the adapter or adapters, no adjustments in the arrangement or orientation of the superstructure can be made without destroying the attachment.

In order to minimise this inflammation risk, the cementation step has to be performed very carefully in a clinical environment, thus rendering the treatment procedure laborious.

For the case of dental superstructures that are attached to dental implants without the use of adapters, due to the absence of a cemented attachment, no failure/tolerance compensating feature such as that referred to above exists. Therefore, possible misfits or misalignments between superstructure and implants result in a higher risk of fracture, for example, due to stress peaks in the superstructure.

Hence, there remains a need for a reliable and efficient approach for attaching a dental superstructure to a dental implant or dental implants which allows for misalignments or misfits between superstructure and implant or implants to be compensated, thus minimising the risk of damage to these components, such as fracture thereof.

SUMMARY OF THE INVENTION

Accordingly, it is an object of the present invention to provide an adapter for attaching a first dental component, such as dental superstructure to a second dental component, such as a dental implant or a dental implant analog, which allows for misalignments or misfits between the first and the second dental implant component, for example a superstructure and an implant, to be reliably and efficiently compensated. Further, the invention aims to provide a dental assembly comprising such an adapter. These goals are achieved by adapters with the technical features of any one of claims 1 to 3 and by dental assemblies with the features of any one of claims 14 and 15. Preferred embodiments of the invention follow from the dependent claims.

According to a first aspect, the invention provides an adapter for attaching a first dental component, such as dental superstructure to a second dental component, such as a dental implant or a dental implant analog, wherein the adapter comprises a coronal attachment portion for attaching the adapter to the dental superstructure, an apical attachment portion for attaching the adapter to the second dental component and an intermediate portion arranged between the coronal attachment portion and the apical attachment portion. The apical attachment portion is a protrusion defining an apical end portion of the adapter and configured to be received in a corresponding recess of the component. The protrusion is rotationally symmetric, so that the adapter is rotatable relative to the second dental component in the state of attachment of the adapter to the second dental component.

Herein, an object, for example said protrusion, is rotationally symmetric, if a rotation thereof around an axis (i.e., the symmetry axis) by any angle maps the object onto itself.

Herein, the term "dental superstructure" refers to a multiple tooth restoration, such as a dental bridge, for example, the NobelProcera® Implant Bridge by Nobel Biocare.

The protrusion is rotationally symmetric around the direction from the coronal attachment portion towards the apical attachment portion, i.e., around the longitudinal direction of the adapter.

For example, in a case wherein the first dental component is a dental superstructure and the second dental component is a dental implant or a dental implant analog, the dental superstructure is attached to the dental implant/dental implant analog via the adapter by attaching the apical attachment portion of the adapter to the dental implant/dental implant analog, i.e., inserting the protrusion into the corresponding recess of the implant/dental implant analog, and attaching the dental superstructure to the coronal attachment portion of the adapter. Alternatively, the adapter can be firstly attached to the superstructure by attaching the coronal attachment portion of the adapter to the superstructure and then, the assembly can be attached to the dental implant/dental implant analog by attaching the apical attachment portion of the adapter to the dental implant/dental implant analog, i.e., inserting the protrusion into the corresponding recess of the implant/dental implant analog.

The coronal attachment portion may have a snap fit or friction fit arrangement for attachment to the dental superstructure, as will be detailed below.

In the state of attachment of the adapter to the dental implant/dental implant analog, the adapter is freely rotatable relative to the dental implant/dental implant analog, due to the rotationally symmetric configuration of the protrusion. Hence, because of this rotational freedom, misalignments or misfits between superstructure and implant can be compensated. In particular, if the dental superstructure is attached to a plurality of dental implants using at least one adapter according to the invention between at least one of said implant and said superstructure, an accurate and reliable fit of the superstructure without stress peaks in the superstructure or the implants can be ensured. Therefore, due to the higher tolerances possible, the dental superstructure can be manufactured in a simple and cost-efficient manner, e.g., by in-lab milling.

According to a second aspect, the invention provides an adapter for attaching a first dental component, such as a dental superstructure, to a second dental component such as a dental implant or a dental implant analog, wherein the adapter comprises a coronal attachment portion for attaching the adapter to the dental superstructure, an apical attachment portion for attaching the adapter to the second dental component and an intermediate portion arranged between the coronal attachment portion and the apical attachment portion. The intermediate portion has a coronal bearing surface for abutting an apical portion of the first dental component and an apical bearing surface opposite to the coronal bearing surface for abutting a coronal portion of the second dental component. The intermediate portion is elastically or plastically deformable at least in the direction from the apical attachment portion towards the coronal attachment portion and the direction from the coronal attachment portion towards the apical attachment portion.

The intermediate portion is thus elastically or plastically deformable along the longitudinal direction of the adapter, which is the direction of attaching the first dental component, for example the dental superstructure, to the second dental component, for example the dental implant/dental implant analog.

Since the intermediate portion is elastically or plastically deformable at least along the longitudinal direction of the adapter, misalignments or misfits between the first dental component, for example the superstructure, and the second implant component, for example the implant, are compensated. Hence, stress accumulation in the superstructure, the adapter and the implant can be prevented. Further, the intermediate portion can act as a deformable loading member, uniformly distributing any stress that may occur, for example, during chewing movements of the patient, within the superstructure, the adapter and the implant. In this way, the risk of fracture of any of these components is significantly reduced.

Moreover, when the intermediate portion is elastically or plastically deformed upon attachment or fixation of the superstructure to the implant via the adapter, a gap between the superstructure and the implant is reliably sealed by the intermediate portion, thus preventing the entry of bacteria into the gap and further reducing the risk of inflammation or infection.

If the dental superstructure is fixed to the dental implant via the adapter by use of a screw, as will be described in detail below, the deformable intermediate portion further acts as a fixation loading member, preventing loosening of the screw and, therefore, ensuring a particularly reliable fit of the superstructure.

The intermediate portion may have a thickness in the longitudinal direction of the adapter, e.g., a distance between the coronal bearing surface and the apical bearing surface, in the range of 0.05 to 0.50 mm, preferably 0.10 to 0.40 mm and more preferably 0.15 to 0.30 mm. Particularly preferably, the intermediate portion has a thickness of 0.2 mm.

The intermediate portion may be made of a ductile material, such as a metal, for example, titanium, a titanium alloy or stainless steel, or a polymer, such as polyether ether ketone (PEEK), a reinforced polymer or the like. Titanium is a particularly preferred material for the intermediate portion.

In one preferred embodiment, the intermediate portion is made of a metal, in particular, titanium, and has a thickness in the range of 0.05 to 0.50 mm, preferably 0.10 to 0.40 mm and more preferably 0.15 to 0.30 mm. Particularly preferably, the intermediate portion is made of titanium and has a thickness of 0.2 mm.

According to a third aspect, the invention provides an adapter for attaching a first dental component, such as dental superstructure to a second component, such as a dental implant or a dental implant analog, wherein the adapter comprises a coronal attachment portion for attaching the adapter to the first dental component, an apical attachment portion for attaching the adapter to the second dental component and an intermediate portion arranged between the coronal attachment portion and the apical attachment portion. The coronal attachment portion and/or the apical attachment portion is/are elastically or plastically deformable at least in all directions perpendicular to the direction from the apical attachment portion towards the coronal attachment portion, i.e., the longitudinal direction of the adapter.

Hence, any misalignments or misfits between the dental superstructure and the implant can be compensated by the elastic or plastic deformation of the coronal attachment portion and/or the apical attachment portion. In this way, a stress accumulation or the formation of stress peaks in, for example, the superstructure, the adapter or the implant can be avoided, thus minimising the risk of damage, such as fracture, to any of these components.

In one preferred embodiment, both the coronal attachment portion and the apical attachment portion are elastically or plastically deformable at least in all directions perpendicular to the direction from the apical attachment portion towards the coronal attachment portion.

The coronal attachment portion and/or the apical attachment portion may be formed as a hollow or tubular body, such as a hollow or tubular cylinder, with a, preferably constant, wall thickness in the directions perpendicular to the longitudinal direction of the adapter in the range of 0.05 to 0.80 mm, preferably 0.10 to 0.60 mm and more preferably 0.20 to 0.50 mm.

The coronal attachment portion and/or the apical attachment portion may be formed of a ductile material, such as a metal, for example, titanium, a titanium alloy or stainless steel, or a polymer, such as polyether ether ketone (PEEK), a reinforced polymer or the like. Titanium is a particularly preferred material for the coronal attachment portion and/or the apical attachment portion.

In one preferred embodiment, the coronal attachment portion and/or the apical attachment portion is/are made of a metal, in particular, titanium, and has a wall thickness in the range of 0.10 to 0.50 mm.

Also for the adapter according to the first and second aspects of the invention, the coronal attachment portion and/or the apical attachment portion may be elastically or plastically deformable at least in all directions perpendicular to the direction from the apical attachment portion towards the coronal attachment portion. In this way, a particularly high degree of freedom between the dental superstructure and the implant or implants can be ensured, thus further minimising the risk of damage to the superstructure, the adapter and the implant.

For the adapter according to the first aspect of the invention, the intermediate portion may have a coronal bearing surface for abutting an apical portion of the dental superstructure and an apical bearing surface opposite to the coronal bearing surface for abutting a coronal portion of the dental implant. The intermediate portion may be elastically or plastically deformable at least in the direction from the apical attachment portion towards the coronal attachment portion and the direction from the coronal attachment portion towards the apical attachment portion, as has been detailed above. Also this configuration provides a particularly high degree of freedom for the arrangement of the dental superstructure relative to the implant or implants, thus minimising any build-up of stress in these components.

Further, in addition to such an intermediate portion, the adapter according to the first aspect of the invention may have a coronal attachment portion and/or an apical attachment portion that is elastically or plastically deformable at least in all directions perpendicular to the direction from the apical attachment portion towards the coronal attachment portion.

In particular, for the case of the adapter of the invention having the intermediate portion which is elastically or plastically deformable at least along the longitudinal direction of the adapter and the coronal attachment portion and/or apical attachment portion that is elastically or plastically deformable at least in all directions perpendicular to the longitudinal direction of the adapter, it can be especially reliably ensured that misalignments or misfits of the dental superstructure and the dental implant are reliably compensated in all three dimensions.

The intermediate portion of the adapter of the present invention may extend outwardly from an outer surface of a remainder of the adapter, e.g., in directions substantially perpendicular to the longitudinal direction of the adapter.

The intermediate portion of the adapter of the present invention may have a substantially annular shape. The annulus preferably lies in a plane which is substantially perpendicular to the direction from the coronal attachment portion towards the apical attachment portion, i.e., the longitudinal direction of the adapter. The coronal bearing surface and the apical bearing surface may define the upper surface and the lower surface, respectively, of the annulus of the intermediate portion.

Such an annular shape enables a particularly uniform and homogeneous distribution of forces acting on the adapter, e.g., during attachment or fixation of the superstructure to the implant or during chewing movements of the patient. Hence, any stress accumulation in the superstructure, the adapter and the implant can be particularly reliably prevented.

The adapter of the invention may further comprise a through hole extending through the adapter in the direction from the coronal attachment portion towards the apical attachment portion, i.e., the longitudinal direction of the adapter. In this case, the dental superstructure can be fixed to the implant via the adapter by means of a screw that passes through the through hole formed in the adapter. In particular, the dental superstructure may be provided with a through hole having a screw seat for retaining a head of the screw. A threaded lower portion of the screw may be inserted into a threaded bore formed in the dental implant, so that the superstructure can be reliably attached to the implant via the adapter by means of the screw.

By providing the adapter with such a through hole, a reversible fixed connection between superstructure and implant, i.e., a connection that can be easily released, is obtained. Hence, any errors or deviations in positioning the adapter or adapters or the superstructure relative to the implant or implants can be corrected in a simple and non-destructive manner.

Further, no cement is required for reliably and securely attaching the superstructure to the implant, so that the risk of inflammation in the patient's mouth can be minimised.

The screw may be fixable to the dental implant with a tightening torque in the range of 15 to 50 Ncm, preferably 20 to 45 Ncm and more preferably 25 to 40 Ncm. Particularly preferably, the tightening torque is 35 Ncm.

The coronal attachment portion, the apical attachment portion and the intermediate portion may be made of different materials. Alternatively, the coronal attachment portion, the apical attachment portion and the intermediate portion may be made of the same material.

As a non limiting example, the young's modulus of an adapter or of a portion or part of the adapter made of titanium or titanium alloy according the invention may be at least 105 GPa. Said young's modulus may also be comprised between 105-120 GPa.

One, two or all of the coronal attachment portion, the apical attachment portion and the intermediate portion may be made of a ductile material, such as a metal, for example, titanium, a titanium alloy or stainless steel, or a polymer, such as polyether ether ketone (PEEK), a reinforced polymer or the like. The entire adapter of the invention may be made of such a material.

The adapter of the invention may be manufactured, for example, by a subtractive method, such as milling, e.g., CNC milling or CNC turning, by injection moulding or by selective laser sintering. In this way, the adapter can be manufactured in a simple manner and the manufacturing costs can be further reduced.

The intermediate portion of the adapter of the invention may have a substantially constant thickness in the direction from the coronal attachment portion towards the apical attachment portion throughout the intermediate portion. In this way, a particularly homogeneous distribution of external forces, such as chewing forces, throughout the intermediate portion can be ensured.

The coronal attachment portion of the adapter of the invention may have a snap fit arrangement including at least one flexible element, such as a flexible arm, with a projection that is configured to be received in a corresponding cavity formed in an apical portion of the dental superstructure. In this way, the adapter can be reliably attached to the superstructure.

The snap fit arrangement may include at least one flexible element with a respective projection. The snap fit arrangement may include a plurality of flexible elements with respective projections, such as two or more flexible elements, three or more flexible elements or four or more flexible elements. The projections of the flexible elements may be received in one corresponding cavity or a plurality of corresponding cavities formed in the apical portion of the dental superstructure. Having a plurality of flexible elements, for example three flexible elements, allows for a self-centring of the adapter relative to the superstructure.

The snap fit arrangement may hold the coronal attachment portion in connection with the dental superstructure with a holding force in the range from 5 to 150 N, preferably 7 to 100 N and more preferably 10 to 50 N.

An adapter comprising a coronal attachment portion with a snap fit arrangement as described above can be advantageously used as a clinical adapter to be introduced into a patient's mouth. The snap fit arrangement ensures a particularly reliable attachment of the superstructure to the adapter and thus also to the implant. Hence, the adapter is securely held in its position relative to the superstructure, facilitating placement of the superstructure in the patient's mouth.

Alternatively, the coronal attachment portion of the adapter of the invention may be configured to be attached to the dental superstructure by friction fit. In particular, the coronal attachment portion may be a protrusion configured to be received in a corresponding recess of the dental superstructure. The protrusion may be held in this recess by friction between protrusion and recess.

For the case of such a friction fit, the holding force of the coronal attachment portion in connection to the dental superstructure may be in the range of 5 to 150 N, preferably 7 to 100 N and more preferably 10 to 50 N.

An adapter with a coronal attachment portion configured to be attached to the superstructure by friction fit can be advantageously used as a laboratory or lab adapter to be used, for example, during the production phase of the superstructure. In particular, the friction fit between adapter and superstructure allows for the adapter to be removed therefrom in a simple manner during different manufacturing steps, e.g., when the superstructure is attached to and detached from different apparatuses. Further, due to the easy removal of the adapter from the superstructure, it can be reused in the laboratory.

The apical attachment portion and the intermediate portion of the lab adapter may be substantially identical to the apical attachment portion and the intermediate portion, respectively, of the clinical adapter.

As has been detailed above, the intermediate portion of the adapter of the invention may have a coronal bearing surface for abutting an apical portion of the firsts dental component, such as a dental superstructure, and an apical bearing surface opposite to the coronal bearing surface for abutting a coronal portion of the second dental component, such as a dental implant. The coronal bearing surface may have at least one convex portion and the apical bearing surface may have at least one corresponding concave portion and/or the coronal bearing surface may have at least one concave portion and the apical bearing surface may have at least one corresponding convex portion. In this case, the intermediate portion has a curved, warped, undulating or corrugated shape in the longitudinal direction of the adapter, ensuring that this portion is particularly reliably and efficiently deformable along this direction.

The coronal bearing surface may have only one, i.e., a single, convex portion and the apical bearing surface may have only one corresponding concave portion and/or the coronal bearing surface may have only one concave portion and the apical bearing surface may have only one corresponding convex portion. In this case, the intermediate portion has a curved or warped shape.

Alternatively, the coronal bearing surface may have one or more convex portions and one or more concave portions and the apical bearing surface may have one or more corresponding concave portions and one or more corresponding convex portions, thus providing an intermediate portion with an undulating or corrugated shape that may extend along the circumference, preferably the entire circumference, of the adapter. Such an undulating or corrugated shape of the intermediate portion ensures that external forces, such as chewing forces, acting on the intermediate portion are uniformly distributed throughout the intermediate portion.

The adapter of the invention may have a marking, such as a colour code. Such a marking ensures that an incorrect use of the adapter is prevented. For example, the marking, such as the colour code, may indicate an outer diameter of the coronal attachment portion and/or the apical attachment portion. This marking can also help to avoid use of lab adapter instead of a clinical adapter. Further, the adapter may be marked, coloured or colour-coded for a visually better appearance thereof, e.g., in the attached state in a patient's mouth.

The adapter according to the present invention is suitable for attaching a dental superstructure, such as a dental bridge, e.g., the Procera® Implant Bridge, to a dental implant, providing the technical advantages described in detail above.

However, the adapter of the invention may also be advantageously used for attaching other components, such as a single tooth restoration, an impression taking component, such as open or closed tray impression posts, an intra-oral scanning or desk top scanning locator, a healing abutment, a temporary restoration or a final restoration, to a dental implant (generally referred to as "dental components"). Also in this case, the adapter of the invention offers the advantage of allowing for misalignments or misfits to be compensated, thus significantly reducing the risk of damage, such as fracture, to any of these dental components.

The above components may be made of, for example, a ceramic, a metal, a polymer or a composite material.

The present invention further provides a set comprising at least two adapters, preferably adapters of the invention as described above, for attaching a first dental component, such as a dental superstructure to a second dental component, such as a dental implant, wherein each of the at least two adapters comprises a coronal attachment portion for attaching the adapter to the dental superstructure, an apical attachment portion for attaching the adapter to the second dental component and an intermediate portion arranged between the coronal attachment portion and the apical attachment portion. The apical attachment portion and the intermediate portion of one of the at least two adapters are substantially identical to the apical attachment portion and the intermediate portion, respectively, of the other of the at least two adapters and the coronal attachment portion of the one of the at least two adapters is different from the coronal attachment portion of the other of the at least two adapters.

The coronal attachment portion of the one of the at least two adapters has a snap fit arrangement including at least one flexible element with a projection that is configured to be received in a corresponding cavity formed in an apical portion of the a dental component and the coronal attachment portion of the other of the at least two adapters is a protrusion configured to be received in a corresponding recess of said dental component.

The one of the at least two adapters described above can be advantageously used as a clinical adapter and the other of these at least two adapters can be advantageously used as a lab adapter.

The coronal attachment portion of the other of the at least two adapters may be configured to be attached to the dental superstructure by friction fit.

At least one of the above at least two adapters may have a marking, such as colour code. In this way, it can be reliably ensured that the clinical adapter and the lab adapter are not mixed up.

The invention further provides a dental assembly comprising a dental superstructure and at least one adapter of the invention described above. Preferably, the dental assembly comprises at least two such adapters, more preferably at least three such adapters and even more preferably at least four such adapters.

Further, the dental assembly may comprise at least one dental implant, preferably at least two dental implants, more preferably at least three dental implants and even more preferably at least four dental implants.

The dental assembly of the invention provides the effects and advantages already described in detail above for the adapters of the invention.

Moreover, the invention provides a dental assembly comprising a first dental component, such as a dental implant or a dental implant analog, and an adapter, preferably according to the invention as described above, for attaching a second dental component to the first dental component, wherein the adapter comprises a coronal attachment portion for attaching the adapter to the dental superstructure, an apical attachment portion for attaching the adapter to the first dental component and an intermediate portion arranged between the coronal attachment portion and the apical attachment portion. The apical attachment portion is a protrusion defining an apical end portion of the adapter and configured to be received in a corresponding recess of the first dental component, and the protrusion is configured so that the adapter is rotatable relative to the first dental component in the state of attachment of the adapter to the first dental component.

The dental assembly may comprise at least two dental implants, preferably at least three dental implants and more preferably at least four dental implants. The dental assembly may comprise at least two adapters, preferably at least three adapters and more preferably at least four adapters.

The dental assembly may further comprise the dental superstructure.

In the state of attachment of the adapter to the dental implant, the adapter is rotatable relative to the dental implant. Hence, because of this rotational freedom between adapter and implant, misalignments or misfits between superstructure and implant can be compensated. In particular, if the dental superstructure is attached to a plurality of dental implants using a plurality of adapters, an accurate and reliable fit of the superstructure without stress peaks in the superstructure or the implants can be ensured. Therefore, due to the higher tolerances possible, the dental superstructure can be manufactured in a simple and cost-efficient manner, e.g., by in-lab milling.

The dental implant of the invention may have a threaded bore for receiving a threaded portion of a screw, such as that described above, and the adapter may have a through hole extending through the adapter in the direction from the coronal attachment portion towards the apical attachment portion, as has been detailed above. In this way, the dental superstructure and the adapter can be fixed to the implant in a reversible manner, further reducing the risk of inflammation, as has been described in detail above.

The dental superstructure of the invention may be made of, for example, a ceramic, a metal, a polymer or a composite material.

The dental implant of the invention may be made of, for example, a metal, such as titanium, a titanium alloy or stainless steel or a ceramic or polymer such as PEEK.

BRIEF DESCRIPTION OF THE DRAWINGS

Hereinafter, non-limiting examples of the invention are explained with reference to the drawings, in which:

FIG. 1 shows an adapter according to a first embodiment of the present invention, wherein FIG. 1(a) is a perspective view of the adapter, FIG. 1(b) is a side view of the adapter, and FIG. 1(c) is an enlarged view of the region Y in FIG. 1(b);

FIG. 2 shows the adapter according to the first embodiment of the present invention, wherein FIG. 2(a) is a cross-sectional view taken along line A-A in FIG. 1(b), FIG. 2(b) is a top view of the adapter, and FIG. 2(c) is an enlarged view of the region Z in FIG. 2(a);

FIG. 3 shows an adapter according to a second embodiment of the present invention, wherein FIG. 3(a) is a perspective view of the adapter, FIG. 3(b) is a side view of the adapter, and FIG. 3(c) is an enlarged view of the region Y in FIG. 3(b);

FIG. 4 shows the adapter according to the second embodiment of the present invention, wherein FIG. 4(a) is a cross-sectional view taken along line A-A in FIG. 3(b), FIG. 4(b) is a top view of the adapter, and FIG. 4(c) is an enlarged view of the region Z in FIG. 4(a);

FIG. 5 shows a part of a dental superstructure according to an embodiment of the present invention, to which the adapter of the invention is to be attached, wherein FIG. 5(a) is a transparent top view of the part, FIG. 5(b) is a cross-sectional view taken along line C-C in FIG. 5(a), and FIG. 5(c) is an enlarged view of the region Y in FIG. 5(b);

FIG. 6 shows the part of the dental superstructure according to the embodiment of the present invention shown in FIG. 5, wherein FIG. 6(a) is a cross-sectional view taken along line A-A in FIG. 5(a), FIG. 6(b) is a transparent top view of the part, FIG. 6(c) is an enlarged view of the region Z in FIG. 5(b), and FIG. 6(d) is a perspective view of the part;

FIG. 8 shows a dental superstructure according to an embodiment of the present invention, wherein FIG. 8(a) is a perspective view of the dental superstructure in the state of attachment to a model of a lower jaw, and FIG. 8(b) is a perspective view of the dental superstructure showing five adapters according to the present invention attached thereto.

DETAILED DESCRIPTION OF PREFERRED EMBODIMENTS

Preferred embodiments of the present invention will now be described with reference to the accompanying drawings.

Figure 1:
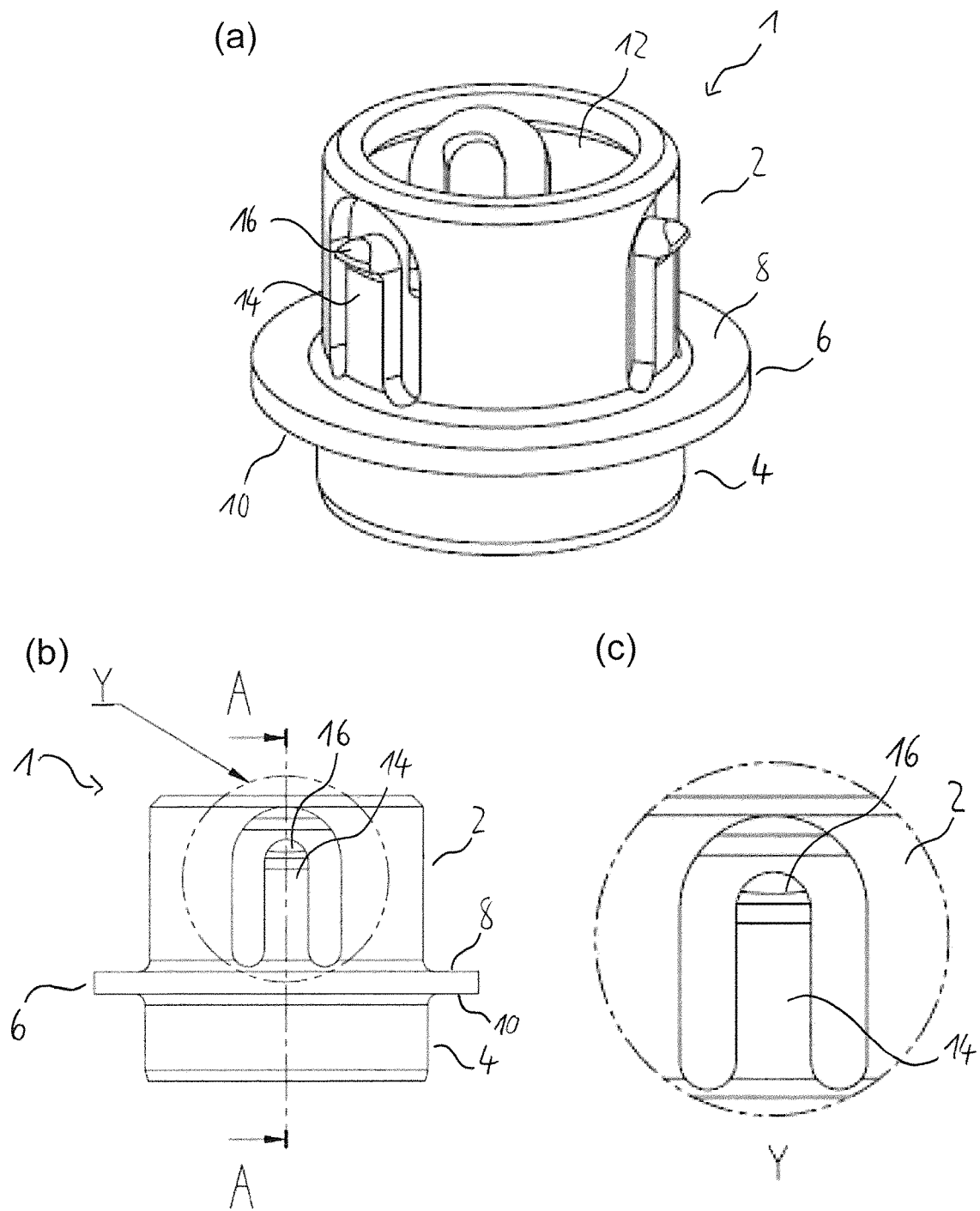
Figure 2:
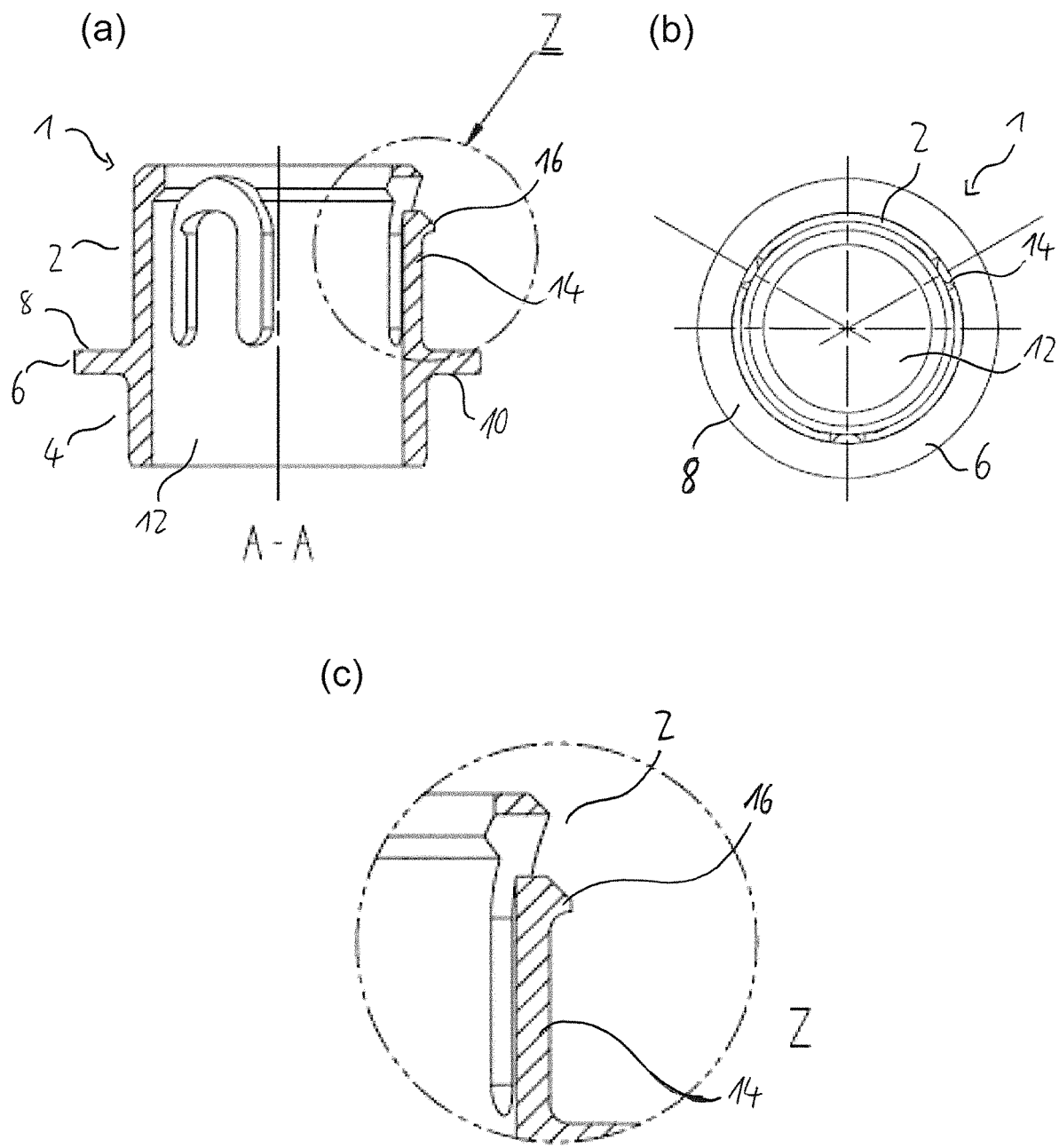

FIGS. 1 and 2 show an adapter 1 according to a first embodiment of the present invention for attaching a dental superstructure to a dental implant.

The adapter 1 comprises a coronal attachment portion 2 for attaching the adapter 1 to the dental superstructure (see FIGS. 7 and 8), an apical attachment portion 4 for attaching the adapter 1 to the dental implant (see FIG. 7) and an intermediate portion 6 arranged between the coronal attachment portion 2 and the apical attachment portion 4. The apical attachment portion 4 is a protrusion defining an apical end portion of the adapter 1 and configured to be received in a corresponding recess of the dental implant (see FIG. 7). The protrusion is rotationally symmetric, so that the adapter 1 is rotatable relative to the dental implant in the state of attachment of the adapter 1 to the implant. Specifically, the protrusion is formed as a cylinder with a circular cross-section.

The entire adapter 1 is made of a metal, preferably titanium or titanium alloy. The adapter may be formed, for example, by milling, by injection moulding, by turning or by selective laser sintering.

As is shown in FIG. 1(a), the intermediate portion 6 has a substantially annular shape with the annulus lying in a plane which is substantially perpendicular to the direction from the coronal attachment portion 2 towards the apical attachment portion 4. As is shown in FIGS. 1(a), 1(b) and 2(a), the intermediate portion 6 extends from an outer surface of the remainder of the adapter 1, including the coronal attachment portion 2 and the apical attachment portion 4, at a substantially right angle.

The intermediate portion 6 has a coronal bearing surface 8 for abutting an apical portion of the dental superstructure and an apical bearing surface 10 opposite to the coronal bearing surface 8 for abutting a coronal portion of the dental implant (see FIGS. 1(a), 1(b), 2(a), 2(b) and 7(a)). The intermediate portion 6 has a substantially constant thickness in the direction from the coronal attachment portion 2 towards the apical attachment portion 4 throughout the intermediate portion 6, i.e., a constant distance between the coronal bearing surface 8 and the apical bearing surface 10. Preferably, the thickness of the intermediate portion 6 is approximately 0.2 mm.

As has been detailed above, the entire adapter 1 and, thus, also the intermediate portion 6 is made of a metal, preferably titanium. Further, the intermediate portion 6 may have a constant small thickness of approximately 0.2 mm. Alternatively, the intermediate portion may have a varying or changing thickness. For example, the intermediate portion may have two or more different thicknesses. Hence, the intermediate portion 6 is elastically deformable in the direction from the apical attachment portion 4 towards the coronal attachment portion 2 and the direction from the coronal attachment portion 2 towards the apical attachment portion 4, i.e., along the longitudinal direction of the adapter 1.

The coronal attachment portion 2 and the apical attachment portion 4 are formed as hollow bodies, in particular, hollow cylinders with a substantially circular cross-section, as is schematically shown in FIGS. 1(a) and 2(b). The wall thickness of the coronal attachment portion 2 and the apical attachment portion 4 is within the range of 0.1 to 0.5 mm, preferably 0.2 mm. Moreover, the coronal attachment portion 2 and the apical attachment portion 4 are made of a metal, preferably titanium, as has been indicated above. The coronal attachment portion 2 and the apical attachment portion 4 are thus elastically deformable in all directions perpendicular to the direction from the apical attachment portion 4 towards the coronal attachment portion 2.

As follows from the explanations provided above, the adapter 1 according to the first embodiment of the present invention has a rotationally symmetric protrusion as the apical attachment portion 4, the intermediate portion 6 is elastically deformable along the longitudinal axis of the adapter 1 and the coronal attachment portion 2 and the apical attachment portion 4 are elastically deformable in all directions perpendicular to the longitudinal axis of the adapter 1.

Hence, the adapter 1 provides maximum freedom when attaching the dental superstructure to the dental implant, allowing for misalignments or misfits to be reliably compensated in all three dimensions. Therefore, a stress accumulation or build-up of stress peaks in the dental superstructure, the adapter or the dental implant can be avoided, thus minimising the risk of damage, such as fracture, to any of these components.

The adapter 1 further comprises a through hole 12 (see FIGS. 1(a), 2(a) and 2(b)) extending through the adapter 1 in the direction from the coronal attachment portion 2 towards the apical attachment portion 4. Hence, the dental superstructure can be fixed to the dental implant via the adapter 1 by passing a screw through the superstructure and the through hole 12 of the adapter 1 and inserting the screw into a threaded bore defined in the dental implant (see FIG. 7(a)).

Therefore, the adapter 1 and the dental superstructure can be fixed to the dental implant in a reversible manner. Since no cement is needed for this fixed connection, the inflammation risk in the patient's mouth is also further reduced.

As is shown in FIGS. 1 and 2, the adapter 1 has a snap fit arrangement including three flexible elements 14, i.e., flexible arms, with respective projections 16 that are configured to be received in a corresponding cavity or corresponding cavities formed in an apical portion of the dental superstructure (see FIGS. 1(a), 1(c), 2(a), 2(c), 5(b), 6(c) and 7(a)). The flexible elements 14 are formed by cutting out surrounding material in the wall of the coronal attachment portion 2, as is shown in FIGS. 1(a) to (c) and FIG. 2(a). The flexible elements 14 are connected to the remainder of the adapter 1 approximately at the level or height of the intermediate portion 6 and extend from this connection in the direction from the apical attachment portion 4 towards the coronal attachment portion 2.

The snap fit arrangement is configured to hold the coronal attachment portion 2 in connection with the dental superstructure with a holding force in the range from 7 to 100 N.

Hence, the coronal attachment portion 2 can be securely attached to the dental superstructure through the snap fit arrangement, allowing for a reliable use of the adapter 1 as a clinical adapter to be introduced in a patient's mouth.

Figure 3:
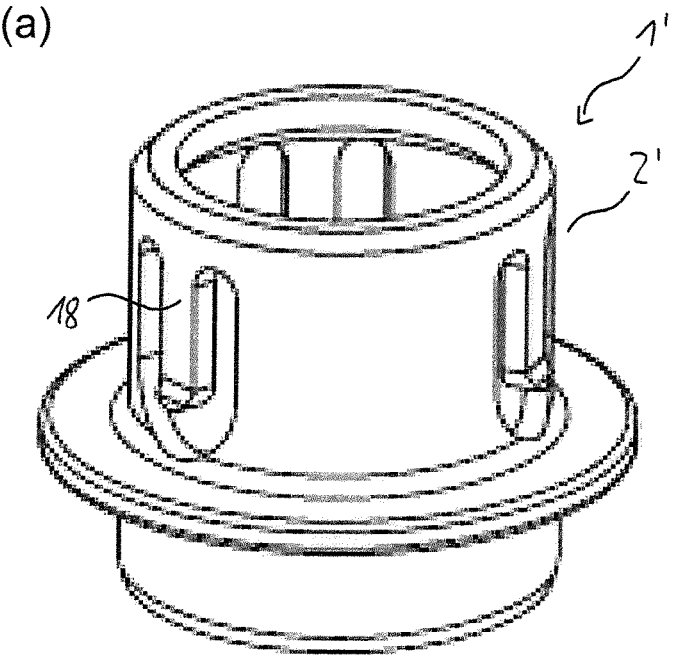
Figure 3:
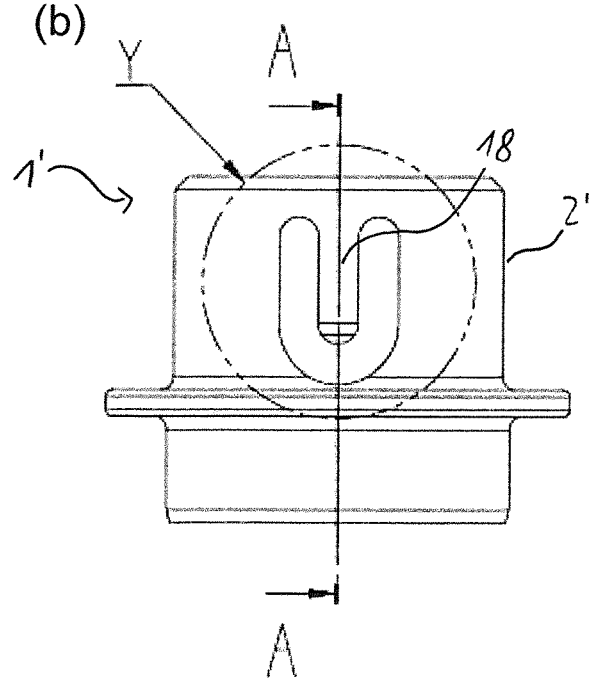
Figure 3:
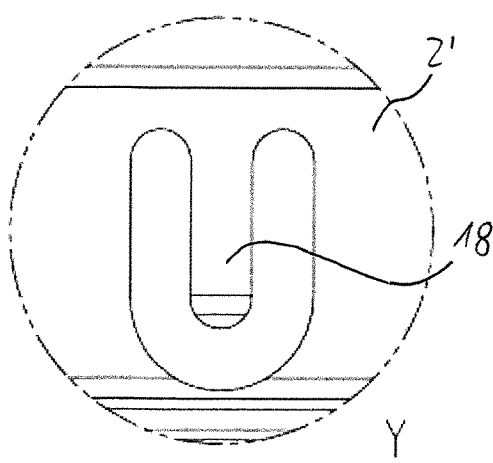
Figure 4:
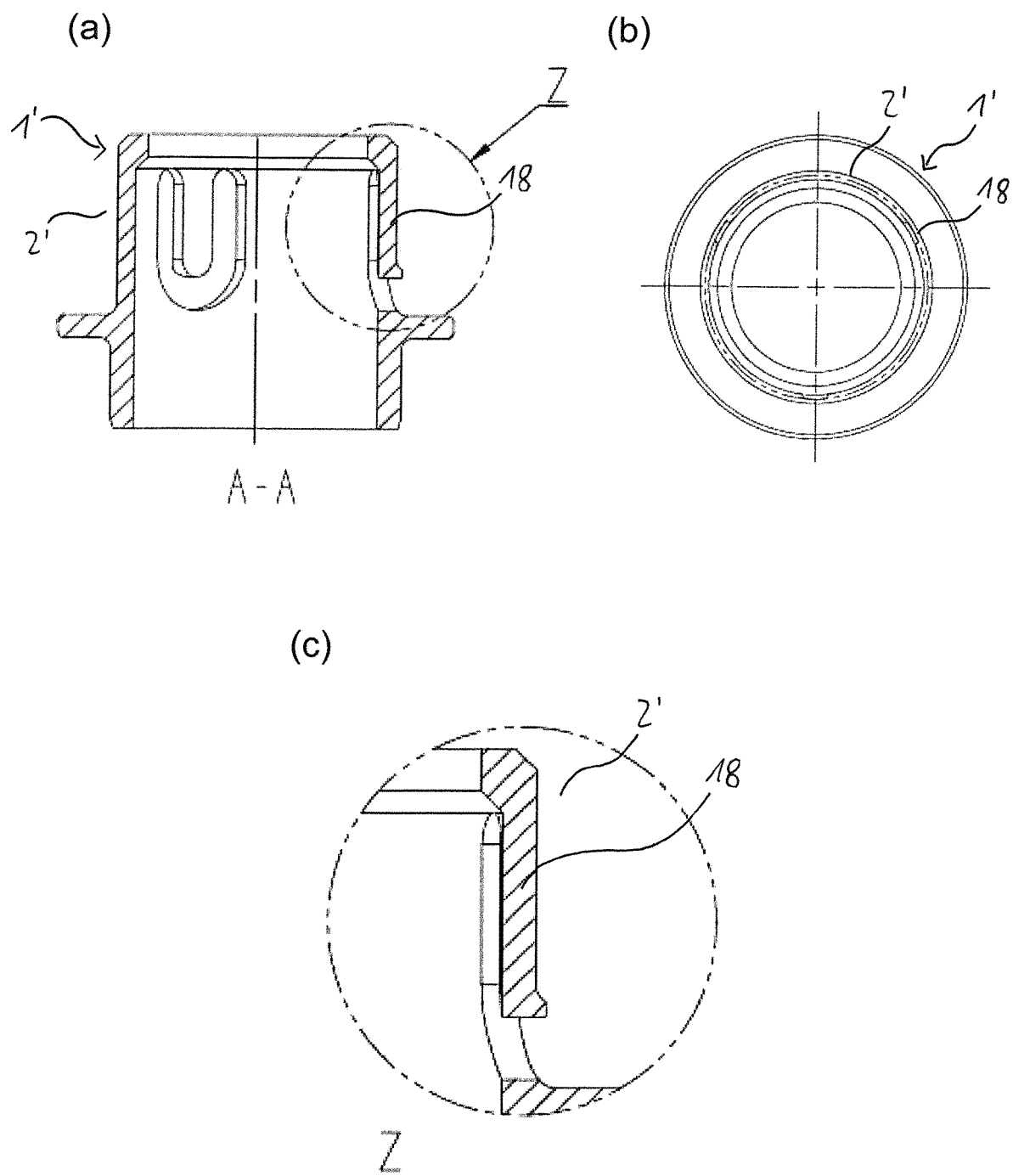

FIGS. 3 and 4 show an adapter 1' according to a second embodiment of the present invention. The apical attachment portion and the intermediate portion of the adapter 1' of the second embodiment are identical to the apical attachment portion 4 and the intermediate portion 6, respectively, of the adapter 1 according to the first embodiment. Hence, a repeated detailed description thereof is omitted.

The adapter 1' according to the second embodiment only differs from the adapter 1 according to the first embodiment in that the coronal attachment portion 2' has a different attachment structure. Specifically, rather than a snap fit arrangement as employed for the adapter 1 according to the first embodiment, the coronal attachment portion 2' of the adapter 1' according to the second embodiment has a friction fit arrangement.

As is shown in FIGS. 3(a) to (c), 4(a) and 4(c), this friction fit arrangement includes three flexible elements 18, i.e., three flexible arms. The flexible elements 18 are formed by cutting out surrounding material from the coronal attachment portion 2'. In contrast to the flexible elements 14 of the adapter 1 according to the first embodiment, these flexible elements 18 are connected to the remainder of the adapter 1' at the coronal end of the coronal attachment portion 2' (see FIGS. 3(a) to (c) and FIGS. 4(a) and (c)). The flexible elements 18 extend from this connection in the direction from the coronal attachment portion 2' towards the apical attachment portion.

The friction fit arrangement is configured to hold the coronal attachment portion 2' in connection with the dental superstructure with a holding force in the range from 7 to 100 N.

The coronal attachment portion 2' with the flexible elements 18 is a protrusion configured to be received in a corresponding recess of the dental superstructure. Due to the friction or holding force generated by the flexible elements 18, the adapter 1' is held in connection to the dental superstructure but can be easily removed therefrom in a non-destructive manner. Hence, the adapter 1' can be advantageously used as a laboratory or lab adapter. In particular, the adapter 1' allows for the removal thereof from the dental superstructure during different steps in the manufacturing process, for example, when the superstructure is attached to and detached from different apparatuses.

The adapter 1 according to the first embodiment and the adapter 1' according to the second embodiment can be used together in a set of adapters for clinical and laboratory purposes.

Figure 5:
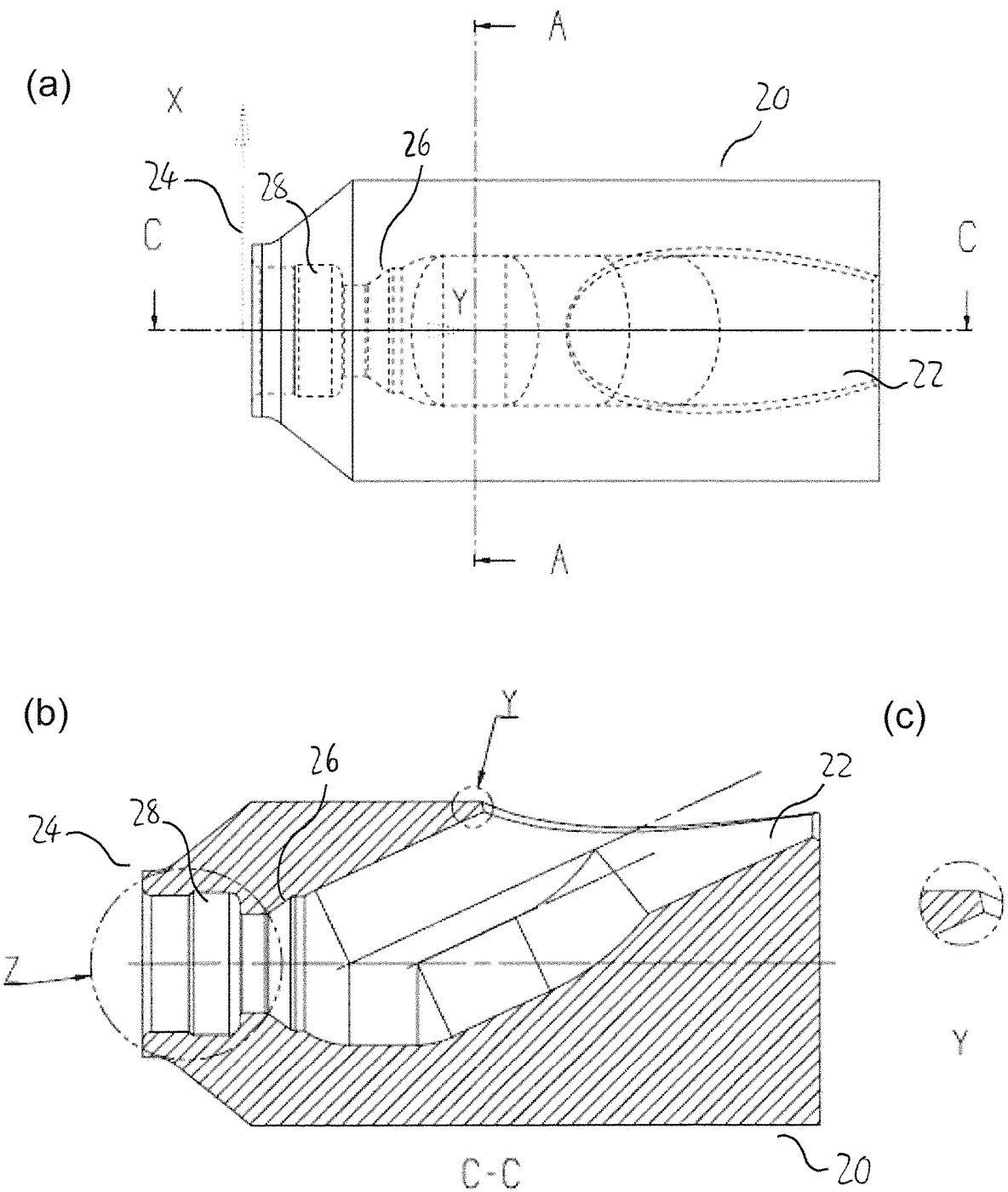
Figure 6:
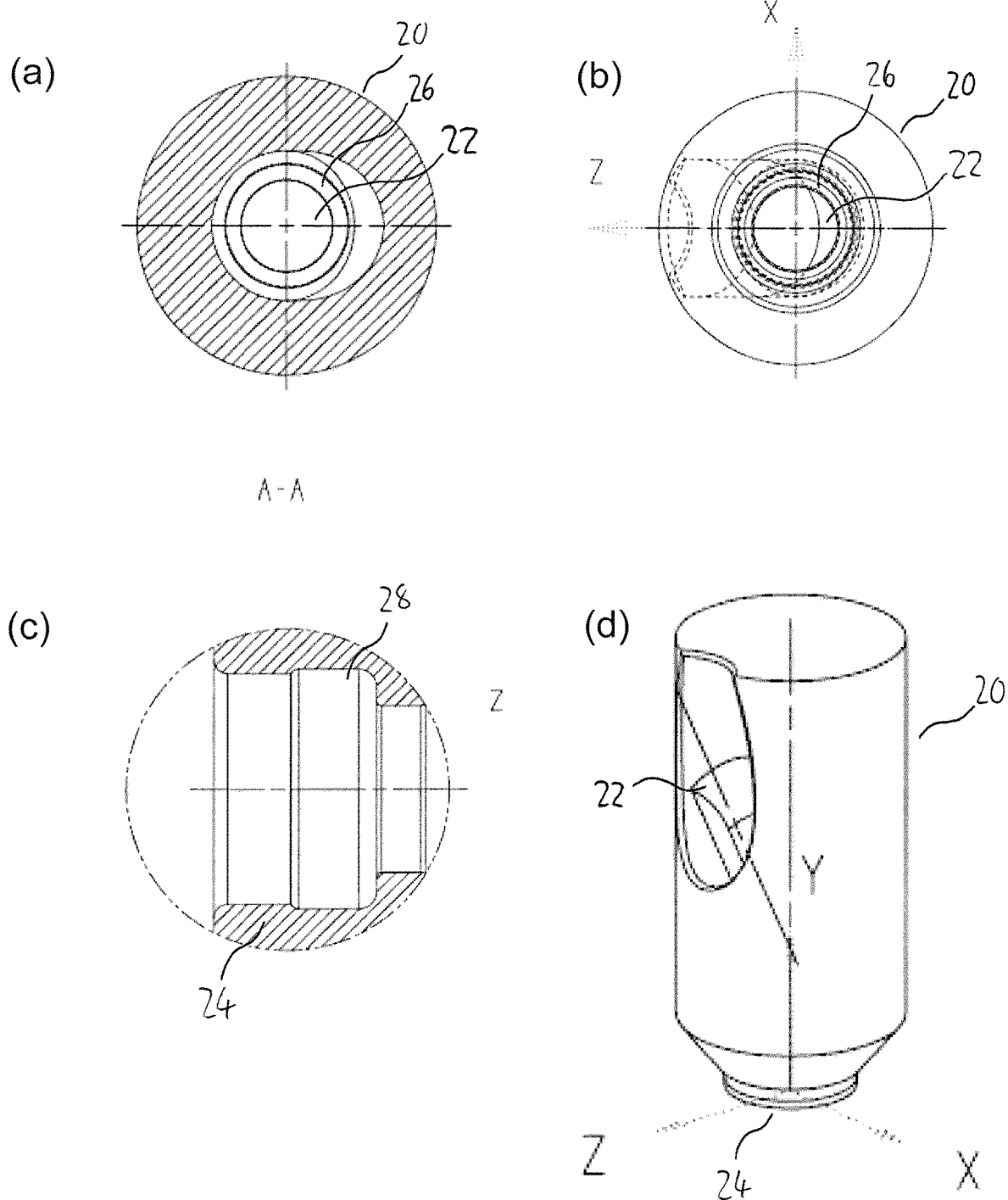

FIGS. 5 and 6 show a part 20 of a dental superstructure according to an embodiment of the present invention including an attachment structure for receiving the coronal attachment portions 2, 2' of the adapters 1, 1' according to the first and second embodiments.

As is shown in FIGS. 5(*a*), 5(*b*), 6(*a*), 6(*b*) and 6(*d*), the part 20 of the superstructure has a through hole 22 extending through the part 20 from a side surface to an apical portion 24 thereof. The through hole 22 comprises a screw seat 26 for resting a screw head thereon (see FIG. 7).

The dental superstructure can be fixed to a dental implant by introducing a screw into the through hole 22 from the coronal side thereof, i.e., from the side surface of the part 20, passing the screw through the through hole 12 of the adapter 1, 1' attached to the apical portion 24 of the part 20 of the superstructure and inserting the screw into a threaded bore formed in the dental implant, as will be described in detail below with reference to FIG. 7. The screw head of the screw rests on the screw seat 26 provided in the through hole 22.

The arrangement of the coronal opening of the through hole 22 in a side surface of the part 20 of the dental superstructure offers the advantage that this opening is not visible in a top view on the superstructure. In an alternative embodiment of the dental superstructure, the through hole 22 may extend along a substantially straight line from the apical portion 24 to the coronal end of the superstructure.

The apical portion 24 of the dental superstructure is formed with an annular cavity 28 for receiving the projections 16 of the flexible elements 14 of the adapter 1 according to the first embodiment of the present invention, as is shown in FIGS. 5(*a*), 5(*b*) and 6(*c*). Hence, the coronal attachment portion 2 of the clinical adapter 1 can be securely held within the apical end of the through hole 22 (see FIG. 7(*a*)).

However, the dental superstructure, a part 20 of which is shown in FIGS. 5 and 6, can also be used in combination with the adapter 1' according to the second embodiment of the present invention. In this case, the coronal attachment portion 2' is inserted into the recess formed by the apical end of the through hole 22 and held in position by the friction force applied by the flexible elements 18 to the inner wall of the apical end of the through hole 22 (see FIG. 7(*b*)).

Figure 7:
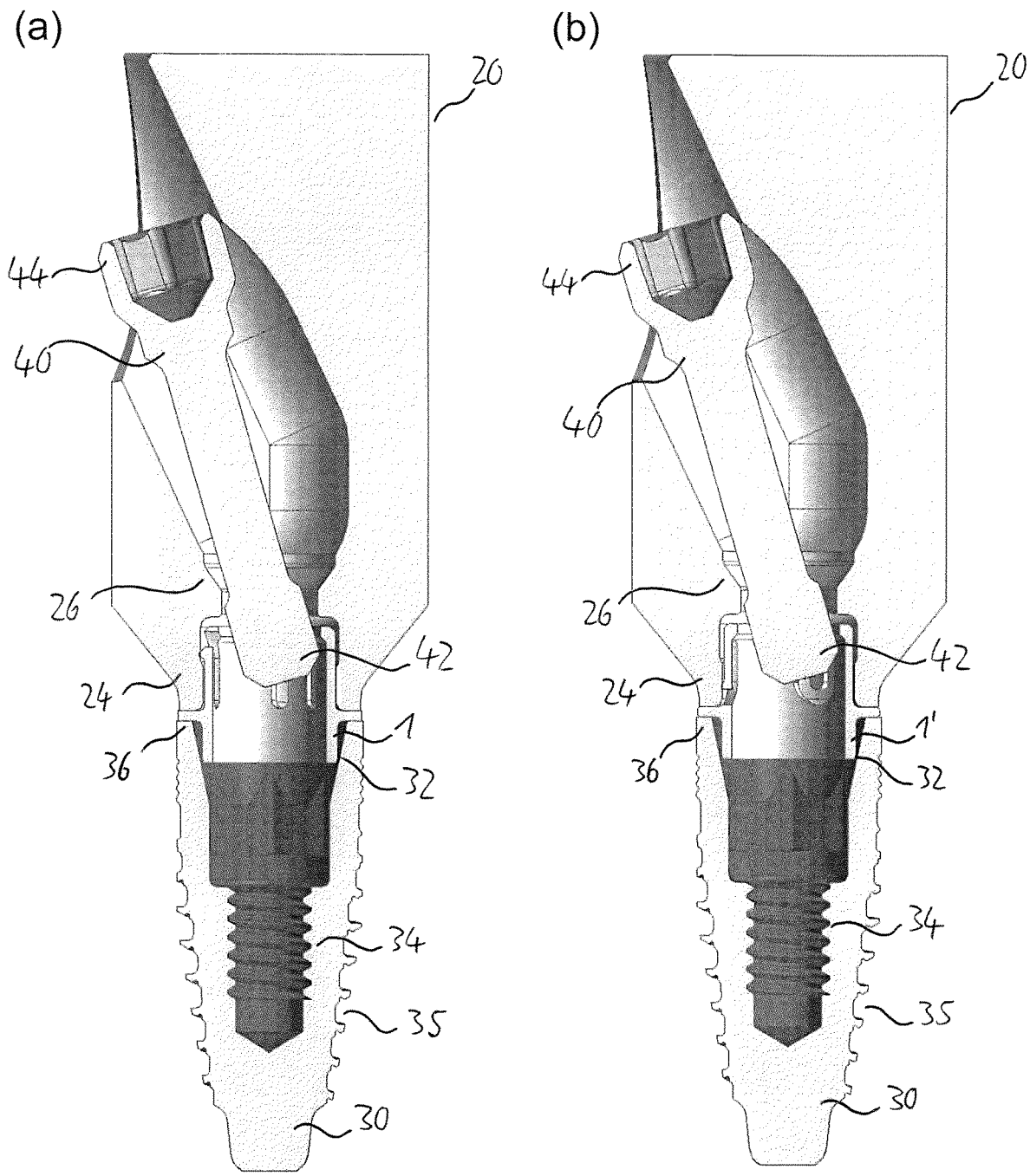
FIG. 7 shows the part of the dental superstructure of FIGS. 5 and 6 in the state of attachment to a dental implant by means of the adapter according to the first embodiment of the present invention (FIG. 7(a)) and by means of the adapter according to the second embodiment of the present invention (FIG. 7(b))

FIG. 7 shows states in which the part 20 of the dental superstructure shown in FIGS. 5 and 6 is attached to a dental implant 30 by means of the adapter 1 according to the first embodiment (FIG. 7(*a*)) and by means of the adapter 1' according to the second embodiment (FIG. 7(*b*)).

As is shown in FIG. 7, the implant 30 has a recess 32 corresponding to the apical attachment portion 4 of the adapter 1, 1' formed at a coronal end of the implant 30, for receiving the apical attachment portion 4. Further, the implant 30 has a threaded bore 34 extending below the recess 32 in the apical direction of the implant 30. Moreover, the implant 30 has an outer threaded portion 35 for screwing the implant 30 into a patient's jaw bone.

The implant 30 is made of a metal, for example, titanium, a titanium alloy, or stainless steel. The implant 30 can also be made of ceramic or of polymer such as PEEK.

When attaching the dental superstructure, the part 20 of which is shown in FIG. 7, to the implant 30, the adapter 1, 1' is attached to the implant 30 by inserting the apical attachment portion 4 in the corresponding recess 32 of the implant 30. In the attached state of the adapter 1, 1' to the implant 30, the apical bearing surface 10 of the adapter 1, 1' abuts a coronal portion 36 of the implant 30. Further, the dental superstructure is attached to the adapter 1, 1' by inserting the coronal attachment portion 2, 2' into the apical end of the through hole 22. In the attached state of the dental superstructure to the adapter 1, 1', the coronal bearing surface 8 abuts the apical portion 24 of the superstructure.

The coronal attachment portion 2, 2' is held in connection to the apical portion 24 by the engagement of the projections 16 of the flexible elements 14 of the adapter 1 with the annular recess 28 for the case of the adapter 1 (see FIG. 7(*a*)) and by friction fit due to the friction force exerted by the flexible elements 18 for the case of the adapter 1' (see FIG. 7(*b*)).

In order to securely fix the dental superstructure, the adapter 1, 1' and the implant 30 in this attached state, a screw 40 is inserted through the coronal opening of the through hole 22 of the dental superstructure, passed through an apical opening of the through hole 22, passed through the through hole 12 of the adapter 1, 1' and inserted into the threaded bore 34 of the implant 30. In FIG. 7, the screw 40 is shown in a half inserted state. In the fully inserted state, a lower threaded portion 42 of the screw 40 is fully received within the threaded bore 34 and a screw head 44 of the screw 40 rests on the screw seat 26, thereby firmly holding the superstructure, the adapter 1, 1' and the implant 30 in their relative positions.

Figure 9:
FIG. 9 schematically illustrates a coronal bearing surface that may have at least one convex portion and the apical bearing surface that may have at least one corresponding concave portion.

As has been detailed above, as shown schematically in FIG. 9, the intermediate portion of the adapter of the invention may have a coronal bearing surface for abutting an apical portion of the firsts dental component, such as a dental superstructure, and an apical bearing surface opposite to the coronal bearing surface for abutting a coronal portion of the second dental component, such as a dental implant. The coronal bearing surface may have at least one convex portion and the apical bearing surface may have at least one corresponding concave portion and/or the coronal bearing surface may have at least one concave portion and the apical bearing surface may have at least one corresponding convex portion. In this case, the intermediate portion has a curved, warped, undulating or corrugated shape in the longitudinal direction of the adapter, ensuring that this portion is particularly reliably and efficiently deformable along this direction.

Figure 8:
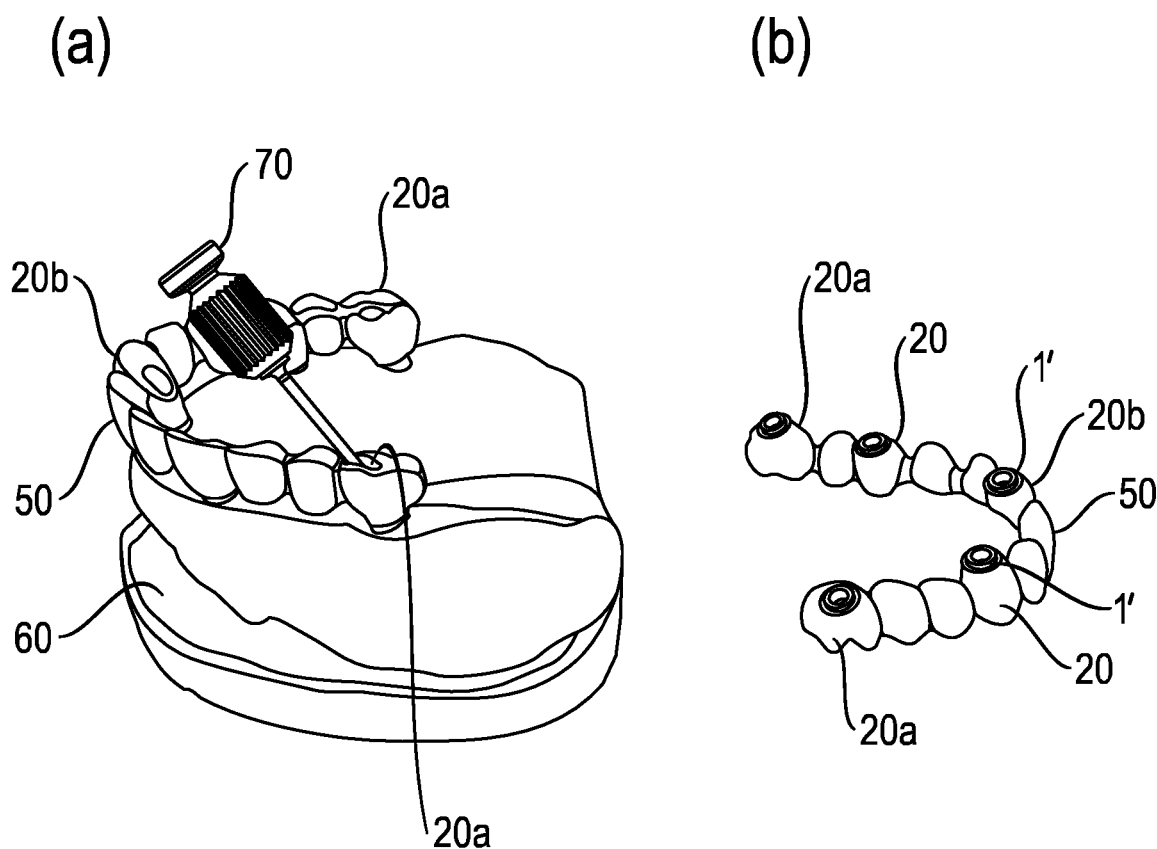

FIG. 8 shows a dental superstructure 50 with five parts 20 (see FIGS. 5 to 7) for attachment to respective implants, such as implants 30 shown in FIG. 7, through adapters 1, 1'.

The dental superstructure 50 is a multiple tooth restoration, e.g., having a metal frame, such as a titanium frame, and a porcelain veneer covering the metal frame. For example, the NobelProcera® Implant Bridge may be used as the dental superstructure 50. In one embodiment, the dental superstructure 50 is made of ceramic. The dental superstructure 50 can also be a full contour restoration not veneered.

FIG. 8(*b*) shows a perspective bottom view of the dental superstructure 50 with five lab adapters 1' inserted into the respective apical end portions of the through holes 22 of the parts 20. As has been detailed above, the adapters 1' are held in their positions relative to the superstructure 50 by friction fit.

FIG. 8(a) shows a state in which the dental superstructure 50 is attached to a model of a patient's lower jaw bone 60 by means of the adapters 1' and corresponding dental implants (not shown) or dental implant analog provided in the jaw bone model 60. In particular, FIG. 8(a) shows two parts 20a with the coronal opening of the through hole 22 arranged at the coronal end surface of the superstructure 50 and one part 20b with the coronal opening of the through hole 22 arranged at a side surface of the superstructure 50 (see also FIGS. 5 to 7).

Moreover, FIG. 8(a) shows a screw driver tool 70 for inserting screws, such as the screws 40 shown in FIG. 7, into the coronal openings of the through holes 22 and tightening the screws, so as to securely fix the dental superstructure 50, the adapters 1' and the implants in this attached state, as has been explained in detail above with reference to FIG. 7.

The dental superstructure 50 can be fixed to a patient's jaw bone substantially in the same manner as illustrated in FIG. 8(a) for the jaw bone model 60. Specifically, the dental implants, such as implants 30 shown in FIG. 7, can be screwed into the jaw bone. Once these implants are osseointegrated in the jaw bone, the dental superstructure 50 is fixed to the implants by means of corresponding adapters 1 and screws, as has been detailed above. However, in this case the clinical adapters 1 according to the first embodiment rather than the lab adapters 1' according to the second embodiment are used, so that the adapters 1 are held in their positions relative to the superstructure 50 by snap fit to avoid that the patient swallow the adapter.

Due to the rotatable arrangement of the apical attachment portions 4 and the deformability of the coronal attachment portion 2', the apical attachment portion 4 and the intermediate portion 6 of the adapters 1, 1', any misalignment or misfit between the dental superstructure 50 and the implants can be reliably and efficiently compensated in all three dimensions.

Further, the deformable intermediate portion 6 reduces stress accumulation in the superstructure 50, the adapters 1, 1' and the implants and acts as a loading member to uniformly distribute stress, such as chewing forces, within superstructure 50, adapters 1, 1' and implants. Moreover, the deformable intermediate portion 6 also prevents loosening of the screws 40 and reliably seals the gap between the superstructure 50 and the implants (see FIG. 7), thus preventing bacteria from accumulating at the connection between superstructure 50 and implants.

The invention claimed is:

1. An adapter for attaching a first dental component to a second dental component, the adapter comprising:
 a coronal attachment portion for attaching the adapter to the first dental component;
 an apical attachment portion for attaching the adapter to the second dental component; and
 an intermediate portion arranged between the coronal attachment portion and the apical attachment portion;
 wherein the intermediate portion has a coronal bearing surface for abutting an apical portion of the first dental component and an apical bearing surface opposite to the coronal bearing surface for abutting a coronal portion of the second dental component;
 wherein the apical attachment portion is a protrusion extending from the apical bearing surface of the intermediate portion and defining an apical end portion of the adapter and configured to be received in a corresponding recess of the second dental component,
 wherein the protrusion along its length from the intermediate portion to the apical end portion has a circular cross-section and is rotationally symmetric, so that the adapter is rotatable relative to the second dental component in the state of attachment of the adapter to the second dental component, and
 wherein the coronal attachment portion has a snap fit arrangement including at least one flexible element with a projection that is configured to be received in a corresponding cavity formed in an apical portion of a dental superstructure, the at least one flexible element positioned with a cutout of a wall of the coronal attachment portion, the cutout terminating below a coronal end of the coronal attachment portion.

2. The adapter according to claim 1, wherein the coronal attachment portion and/or the apical attachment portion is/are elastically or plastically deformable at least in all directions perpendicular to the direction from the apical attachment portion towards the coronal attachment portion.

3. The adapter according to claim 1,
 wherein the intermediate portion is elastically or plastically deformable at least in the direction from the apical attachment portion towards the coronal attachment portion and the direction from the coronal attachment portion towards the apical attachment portion.

4. The adapter according to claim 1, wherein the intermediate portion has a annular shape with the annulus lying in a plane which is perpendicular to the direction from the coronal attachment portion towards the apical attachment portion.

5. The adapter according to claim 1, further comprising a through hole extending through the adapter in the direction from the coronal attachment portion towards the apical attachment portion.

6. The adapter according to claim 1, wherein the coronal attachment portion, the apical attachment portion and the intermediate portion are made of the same material.

7. The adapter according to claim 1, wherein the intermediate portion has a constant thickness in the direction from the coronal attachment portion towards the apical attachment portion throughout the intermediate portion.

8. The adapter according to claim 1, wherein the coronal attachment portion has a protrusion configured to be received in a corresponding recess of the dental superstructure and to be held in this recess by friction fit.

9. The adapter according to claim 1, wherein the adapter has a marking.

10. A dental assembly comprising a dental component and at least one adapter according to claim 1.

* * * * *